(12) United States Patent
Wolf et al.

(10) Patent No.: US 11,649,683 B2
(45) Date of Patent: May 16, 2023

(54) NON-THREADED TUBULAR CONNECTION

(71) Applicant: Schlumberger Technology Corporation, Sugar Land, TX (US)

(72) Inventors: John C. Wolf, Houston, TX (US); Luis A. Gonzalez, Houston, TX (US); Andrew Brian Huang, The Woodlands, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 537 days.

(21) Appl. No.: 14/434,104

(22) PCT Filed: Oct. 10, 2013

(86) PCT No.: PCT/US2013/064248
§ 371 (c)(1),
(2) Date: Apr. 8, 2015

(87) PCT Pub. No.: WO2014/059086
PCT Pub. Date: Apr. 17, 2014

(65) Prior Publication Data
US 2015/0275587 A1 Oct. 1, 2015

Related U.S. Application Data

(60) Provisional application No. 61/713,231, filed on Oct. 12, 2012.

(51) Int. Cl.
*E21B 17/046* (2006.01)
*E21B 17/18* (2006.01)
(Continued)

(52) U.S. Cl.
CPC ............ *E21B 17/046* (2013.01); *E21B 17/18* (2013.01); *E21B 19/16* (2013.01); *F16L 21/03* (2013.01);
(Continued)

(58) Field of Classification Search
CPC ........ E21B 17/046; E21B 17/02; E21B 17/18; E21B 19/16; F16L 21/03; F16L 21/08; F16L 2201/40
See application file for complete search history.

(56) References Cited

U.S. PATENT DOCUMENTS 4,497,371 A * 2/1985 Lindsey, Jr. ........ E21B 23/0413
166/212
6,009,942 A * 1/2000 Williamson ............ E21B 23/12
166/313

(Continued)

FOREIGN PATENT DOCUMENTS

GB 2497488 A 6/2013
JP 2002038866 A 2/2002

OTHER PUBLICATIONS

International Search Report and Written Opinion dated Jan. 7, 2014, for PCT/US20013/064248, filed on Oct. 10, 2013.
(Continued)

*Primary Examiner* — Blake Michener
*Assistant Examiner* — Neel Girish Patel
(74) *Attorney, Agent, or Firm* — Jeffrey D. Frantz

(57) ABSTRACT

A technique facilitates connection of tubulars along a tubing string via a linear motion. A first tubular is provided with a first connector end having a non-circular transverse cross-section, and a second tubular is provided with a second connector end having a corresponding non-circular transverse cross-section. The non-circular cross-section and the corresponding non-circular cross-section are designed to
(Continued)

matingly engage when the first and second tubulars are moved linearly toward each other to form a tubing string. A seal is provided to seal the first connector end with the second connector end once linearly engaged. A locking mechanism may be employed to linearly lock the first connector end with the second connector end.

15 Claims, 4 Drawing Sheets

(51) Int. Cl.
    *E21B 19/16*     (2006.01)
    *F16L 21/03*     (2006.01)
    *F16L 21/08*     (2006.01)
    *F16L 25/14*     (2006.01)
    *F16L 37/14*     (2006.01)

(52) U.S. Cl.
    CPC ............... *F16L 21/08* (2013.01); *F16L 25/14* (2013.01); *F16L 37/14* (2013.01); *F16L 37/142* (2013.01); *F16L 2201/40* (2013.01)

(56) References Cited

U.S. PATENT DOCUMENTS

| | | | | |
|---|---|---|---|---|
| 6,179,347 B1 * | 1/2001 | Dole | ...................... | F16L 37/148 |
| | | | | 285/305 |
| 6,241,033 B1 * | 6/2001 | Hoffman | ................. | E21B 17/00 |
| | | | | 175/320 |
| 6,789,627 B2 * | 9/2004 | Leismer | .................. | E21B 29/04 |
| | | | | 166/242.6 |
| 9,624,745 B2 * | 4/2017 | Sørbø | ....................... | E21B 29/08 |
| 11,333,004 B2 * | 5/2022 | Taylor, Jr. | ............. | E21B 34/063 |
| 11,371,331 B2 * | 6/2022 | Surjaatmadja | ........ | E21B 43/114 |
| 2001/0045283 A1 * | 11/2001 | Leismer | .................. | E21B 29/04 |
| | | | | 166/242.6 |
| 2002/0112857 A1 * | 8/2002 | Ohmer | ................ | E21B 41/0042 |
| | | | | 166/50 |
| 2003/0098155 A1 * | 5/2003 | Guillory | ............... | E21B 17/046 |
| | | | | 166/242.6 |
| 2003/0122373 A1 * | 7/2003 | Hirth | ....................... | F16L 15/08 |
| | | | | 285/318 |
| 2003/0226662 A1 * | 12/2003 | Linyaev | ................ | E21B 47/017 |
| | | | | 166/250.11 |
| 2004/0003945 A1 * | 1/2004 | Springer | ................. | E21B 17/22 |
| | | | | 175/320 |
| 2005/0025710 A1 * | 2/2005 | Schneider | ............ | A61K 49/225 |
| | | | | 424/9.52 |
| 2005/0103497 A1 * | 5/2005 | Gondouin | ............. | E21B 43/121 |
| | | | | 166/57 |
| 2005/0121190 A1 * | 6/2005 | Oberkircher | ........ | E21B 41/0035 |
| | | | | 166/250.1 |
| 2005/0184521 A1 * | 8/2005 | Maguire | ............... | F16L 13/168 |
| | | | | 285/374 |
| 2007/0119600 A1 * | 5/2007 | Slup | ....................... | E21B 33/134 |
| | | | | 166/134 |
| 2009/0261575 A1 * | 10/2009 | Bull | ..................... | F16L 27/1275 |
| | | | | 285/119 |
| 2010/0170677 A1 * | 7/2010 | Ingraham | ............ | E21B 41/0035 |
| | | | | 166/50 |
| 2011/0044697 A1 * | 2/2011 | Peter | .................... | H04B 10/801 |
| | | | | 359/341.1 |
| 2011/0048741 A1 * | 3/2011 | Durst | ...................... | E21B 17/07 |
| | | | | 166/207 |
| 2011/0168411 A1 * | 7/2011 | Braddick | .............. | E21B 43/103 |
| | | | | 166/120 |
| 2011/0203791 A1 * | 8/2011 | Jin | ....................... | E21B 17/1085 |
| | | | | 166/244.1 |
| 2012/0018221 A1 * | 1/2012 | Crane | ..................... | E21B 10/62 |
| | | | | 175/57 |
| 2012/0305266 A1 * | 12/2012 | Steele | ..................... | E21B 17/04 |
| | | | | 166/242.6 |
| 2012/0312561 A1 * | 12/2012 | Hallundb.ae butted.k | .................. | |
| | | | | E21B 29/10 |
| | | | | 166/207 |
| 2013/0153796 A1 * | 6/2013 | Liu | ......................... | E21B 33/10 |
| | | | | 251/1.1 |
| 2020/0232306 A1 * | 7/2020 | Brown-Kerr | ........... | E21B 17/00 |
| 2022/0195805 A1 * | 6/2022 | Hvidsten | ................. | E21B 7/20 |

OTHER PUBLICATIONS

Examination Report for corresponding GB Application Serial No. GB1505003.2, dated Mar. 11, 2019, 4 pages.

* cited by examiner

NON-THREADED TUBULAR CONNECTION

BACKGROUND

In a wide range of well applications, tubulars are joined together and coupled with various equipment to construct tubing strings. The tubing strings may be used in downhole completions and in a variety of service and production procedures. Generally, the tubular components are joined together via threaded connectors in which the tubular components are rotated relative to each other to form the connection before being run downhole. In some applications, the relative rotation utilized to form the connection can limit the utility of the tubing string and/or increase the difficulty of using certain components or performing certain procedures.

SUMMARY

In general, a system and methodology are provided for connecting tubing components with a linear motion. A first tubular is provided with a first connector end having a non-circular transverse cross-section, and a second tubular is provided with a second connector end having a corresponding non-circular transverse cross-section. The non-circular cross-section and the corresponding non-circular cross-section are designed to matingly engage when the first and second tubulars are moved linearly toward each other to form a tubing string. A seal is provided to seal the first connector end with the second connector end once linearly engaged. A locking mechanism may be employed to linearly lock the first connector end with the second connector end.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a system and methodology related to connecting tubulars in a tubing string. Tubulars may comprise pipe/tubing sections and a variety of other components coupled together in a tubing string. By way of example, the system and methodology may be employed to connect two tubular components without using a threaded connection. As described below with respect to various embodiments, the connection can be formed through relative linear movement of the two tubular components. By enabling connection without rotation, the two tubulars being connected may be maintained in a specific alignment. Additionally, the tubulars or sections of the tubulars may use geometries other than a cylinder or cone to form the connection.

This latter characteristic enables creation of space or room to bypass the tubulars, e.g. tubular tools, with a control line which may comprise electrical lines, fluid flow lines, optical fibers, and/or other types of communication lines. By facilitating the use of control lines, the connection system enables or at least simplifies the construction and operation of a wide range of equipment in multilateral completion applications. However, the linear connection system may be utilized for many types of other tubular systems in both well and non-well related applications.

In certain embodiments, the tubular components to be joined have connector ends which have non-circular cross-ssectional features. For example, one tubular may have an oblong connector end sized for sliding receipt in a corresponding oblong interior or recess of the next adjacent tubular. When using such a non-circular shape instead of threaded connections, however, the present linear connection system maintains pressure integrity while still providing space for running control lines along the exterior of the tool. The non-circular features also provide torque resistance, thus allowing torque to be applied to the tubular components through the connection.

Figure 1:
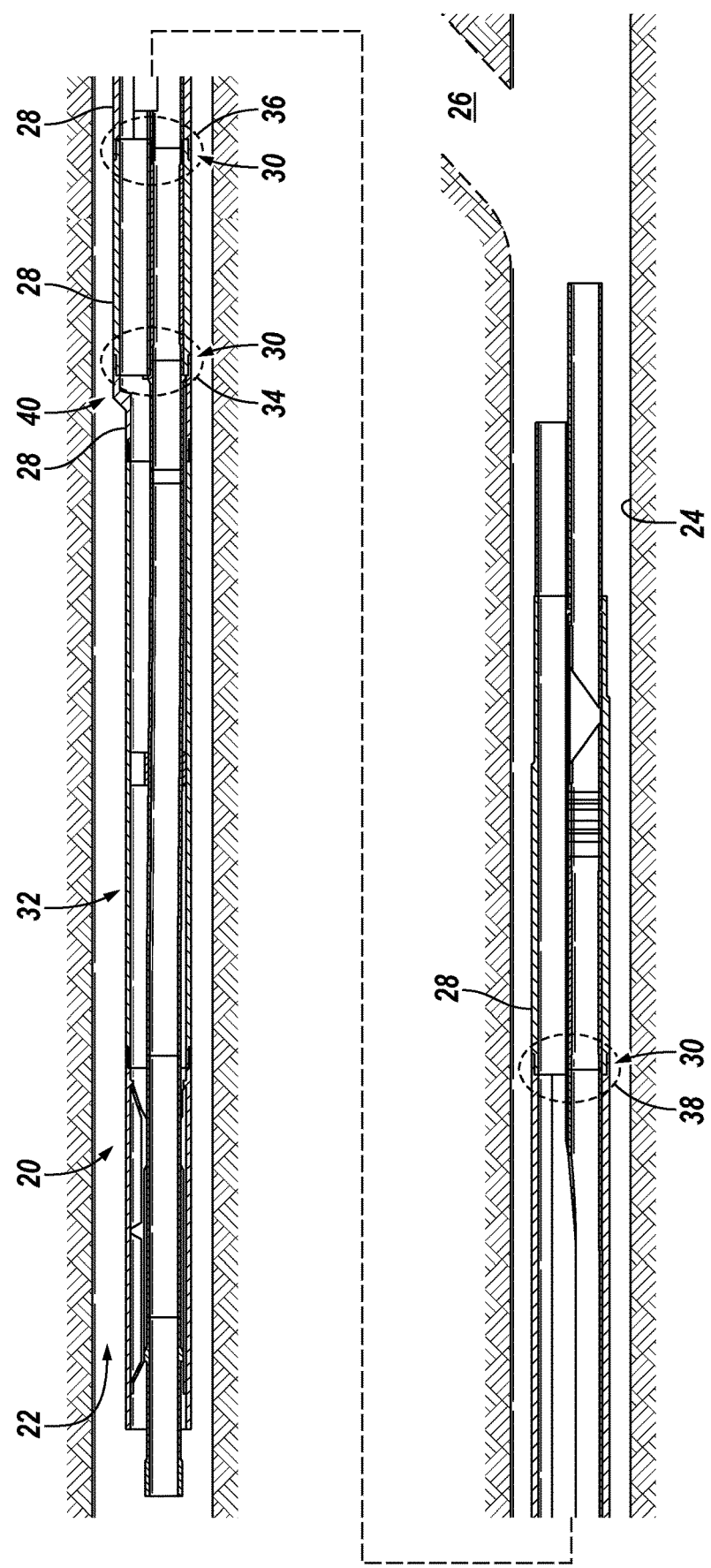
FIG. 1 is a schematic illustration of a multilateral completion system deployed in a wellbore and comprising a plurality of linear connection systems, according to an embodiment of the disclosure.

Referring generally to FIG. 1, an embodiment of a system 20, e.g. a well completion system, is illustrated as deployed in a wellbore 22 having, for example, a main bore 24 and a lateral bore 26. Depending on the application, wellbore 22 may have multiple lateral bores 26. Additionally, system 20 may comprise a variety of well systems utilizing joined tubular components. In some embodiments, system 20 may comprise tubular components employed in non-well related applications, e.g. surface tubing applications. In the example illustrated, well system 20 comprises a plurality of tubular components 28 which are joined by linear connection systems 30. The tubular components 20 may comprise many types of tubing sections, tubular tools, and/or other tubular components which are coupled together to form an overall tubing string 32.

Figure 2:
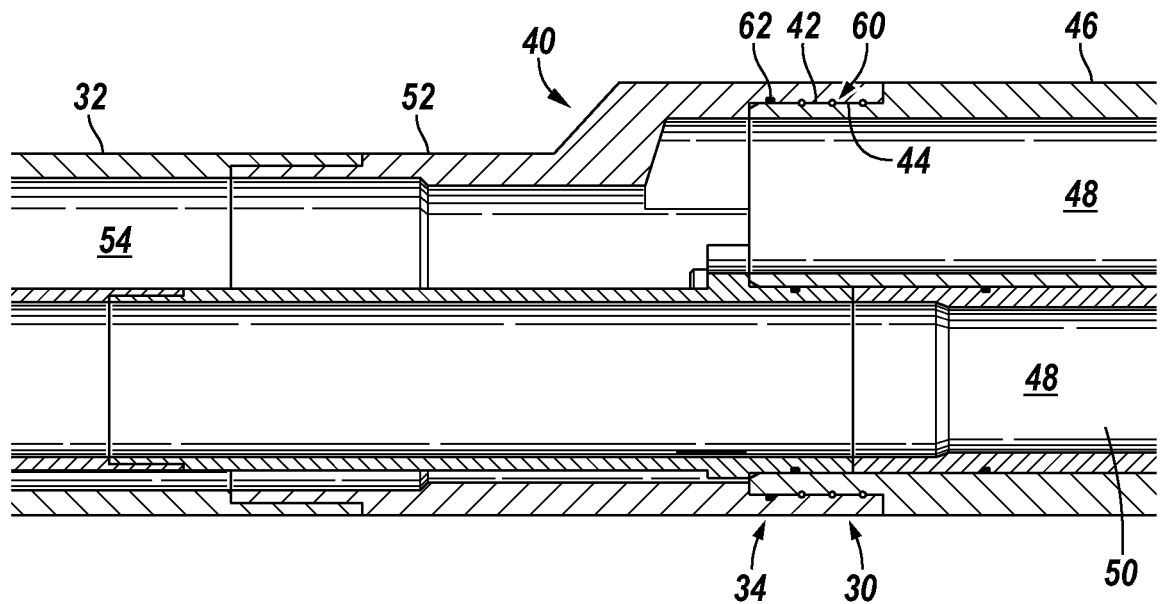
FIG. 2 is a cross-sectional view of an example of a linear connection system for connecting tubulars along the multilateral completion system, according to an embodiment of the disclosure.

In the embodiment illustrated, the tubing string 32 comprises a plurality of the linear connection systems 30 which are indicated at connection regions 34, 36 and 38, respectively. The connection regions 34, 36 and 38 along with the corresponding linear connection systems 30 are illustrated more clearly in FIGS. 2-4. Referring initially to FIG. 2, connection region 34 is illustrated as having first and second tubulars 28 coupled together to form a Y-block 40. By way of example, one of the tubulars 28 may comprise a first connection end 42 slidably received by and engaged with a second connection end 44 of the next adjacent tubular 28. In this embodiment, the first connection end 42 and the second connection end 44 are male and female ends, respectively, such that first connection end 42 is linearly and slidably engaged with second connection end 44. As described in greater detail below, the transverse cross-section of first connection end 42 presents a non-circular shape, e.g. an oblong shape, which corresponds with a transverse, non-circular internal shape of second connection end 44. The mating, non-circular shapes block relative rotation of the adjacent tubulars 28 and thus enable transmission of torque loading from one tubular 28 to the next adjacent tubular 28.

The tubulars 28 may be constructed in a variety of sizes and configurations. For example, one of the tubulars 28, e.g. a first tubular 46, may comprise a plurality of isolated flow passages 48. In the specific example illustrated, the first tubular 46 comprises a pair of the flow passages 48 which allow for separated and isolated fluid flows along the tubing string 32. In some applications, internal tubular components 50 or other internal components 50 may be deployed along one or more of the passages 48. In this embodiment, the next adjacent tubular 28, e.g. a second tubular 52, comprises a single flow passage 54. Depending on the application, the single flow passage 54 may commingle the flows from the plural passages 48. In some applications, internal tubular structures 50 may be positioned to extend into and along flow passage 54 to maintain separation of fluid flows. The linear connection system 30 may be used to couple many types and configurations of adjacent tubulars 28. As described herein, first tubular 46 and second tubular 52 may refer to either tubular 28 for a given linear connection system 30 and may comprise either male or female connection ends.

Figure 3:
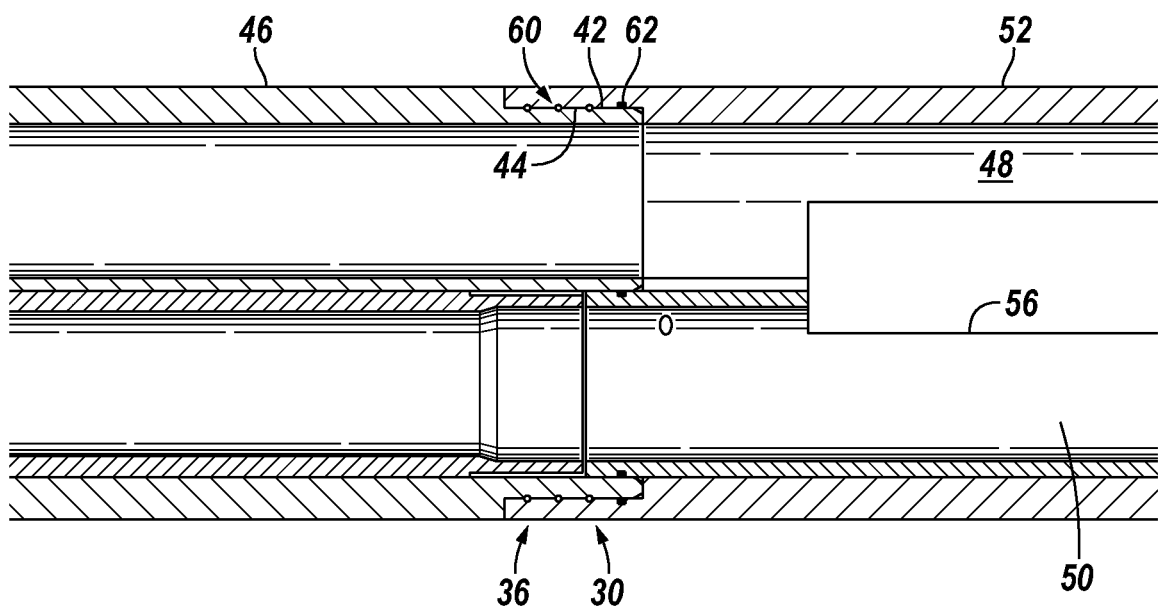
FIG. 3 is a cross-sectional view of another example of a linear connection system for connecting tubulars along the multilateral completion system, according to an embodiment of the disclosure.

Referring generally to FIG. 3, connection region 36 is illustrated as comprising another linear connection system 30. In this embodiment, the linear connection system 30 again connects adjacent tubulars 28 by linearly joining first and second connection ends 42, 44. A variety of other components may be used in combination with the tubulars 28, e.g. in combination with first tubular 46 and second tubular 52. For example, one of the internal tubular components 50 may comprise a window 56 and may be deployed internally within the Y-block 40. The window 56 is oriented to enable intervention operations and/or other operations through a selected passage 48 of the plurality of passages 48 in first tubular 46.

Figure 4:
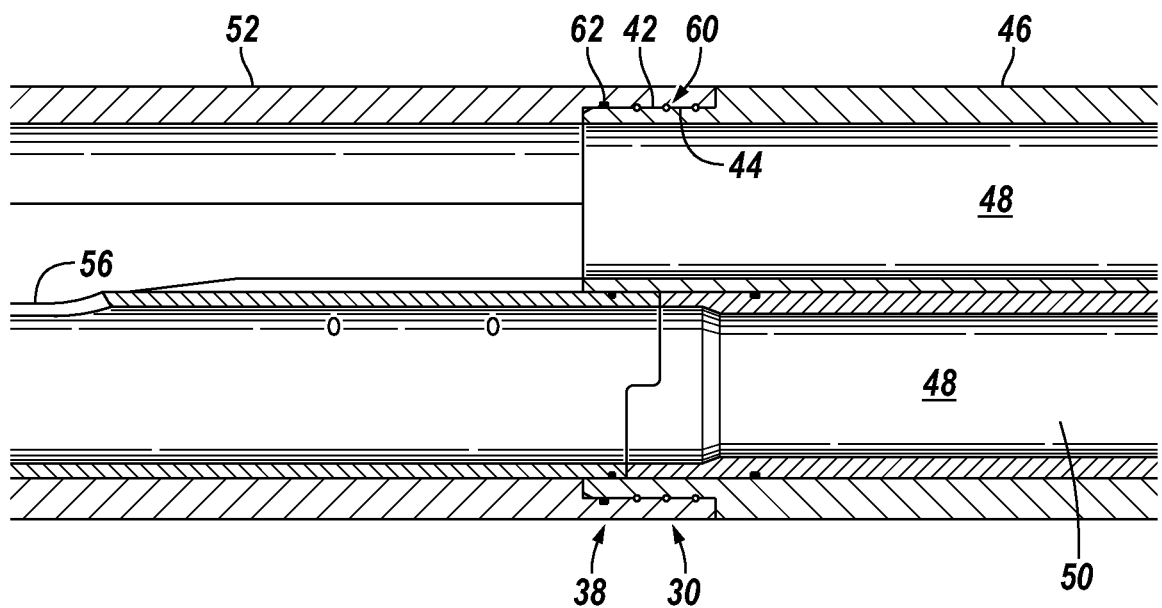
FIG. 4 is a cross-sectional view of another example of a linear connection system for connecting tubulars along the multilateral completion system, according to an embodiment of the disclosure.

Referring generally to FIG. 4, connection region 38 is illustrated as comprising another linear connection system 30. In this embodiment, the linear connection system 30 again connects adjacent tubulars 28 by linearly joining first and second connection ends 42, 44. A variety of other components, e.g. internal tubular components 50, may again be employed within the connected tubulars 28. The ability to form linear connections in constructing tubing string 32 facilitates the use of a wide variety of additional components, e.g. internal tubes or external control lines. The additional components may be positioned internally or externally with respect to the Y-block 40 or other linear connection systems 30.

Figure 5:
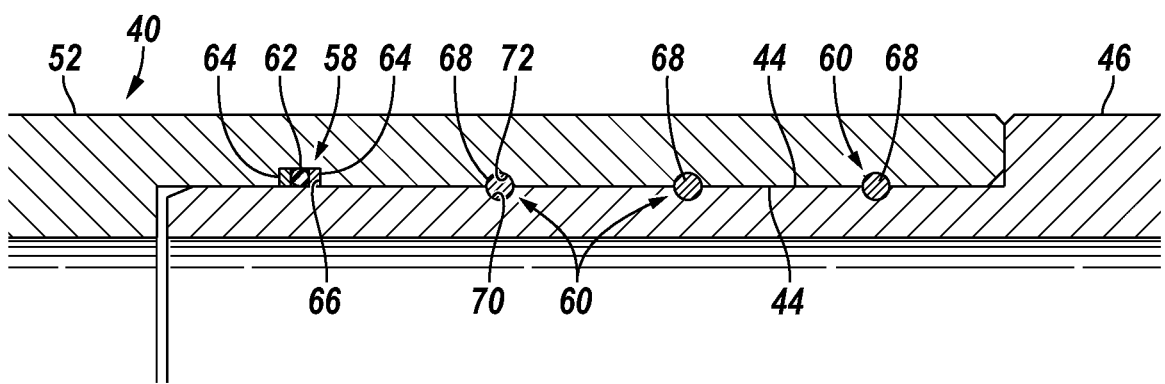
FIG. 5 is a cross-sectional view of an example of engaged connector ends of a linear connection system, according to an embodiment of the disclosure.

In FIG. 5, an enlarged illustration of an example of linear connection system 30 is illustrated. In this embodiment, a seal system 58 and a locking mechanism 60 are positioned between first connector end 42 and second connector end 44. For example, both the seal system 58 and the locking mechanism 60 are positioned radially or laterally between the connector ends 42 and 44. By way of example, the seal system 58 may comprise a seal 62 and a backup ring or rings 64. In many applications, seal 62 may comprise a standard O-ring style seal located in a groove formed in at least one of the connector ends, such as groove 66 formed in an interior surface of connector end 44.

The seal system 58 is designed to provide pressure integrity along the interior, e.g. along flow passages 48, 54, of the first tubular 46 and the second tubular 52. The locking mechanism 60 prevents inadvertent separation of the first connector end 42 from the second connector end 44. In the example illustrated, the locking mechanism 60 is positioned radially or laterally between the first connector end 42 and the second connector end 44.

Although locking mechanism 60 may have a variety of forms, the illustrated embodiment utilizes a locking wire 68. In the specific example illustrated, locking mechanism 60 comprises a plurality of locking wires 68 which lock the tubulars 46, 52 linearly after linear insertion of first connector end 42 into second connector end 44. It should be noted that the non-circular shape of connector ends 42, 44 block relative rotation of the first tubular 46 with respect to the second tubular 52.

Figure 6:
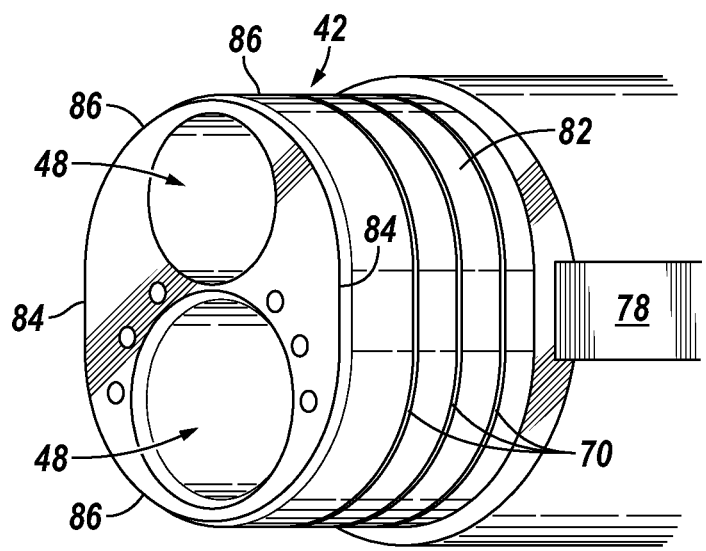
FIG. 6 is an orthogonal view of an example of a connector end, according to an embodiment of the disclosure.
Figure 7:
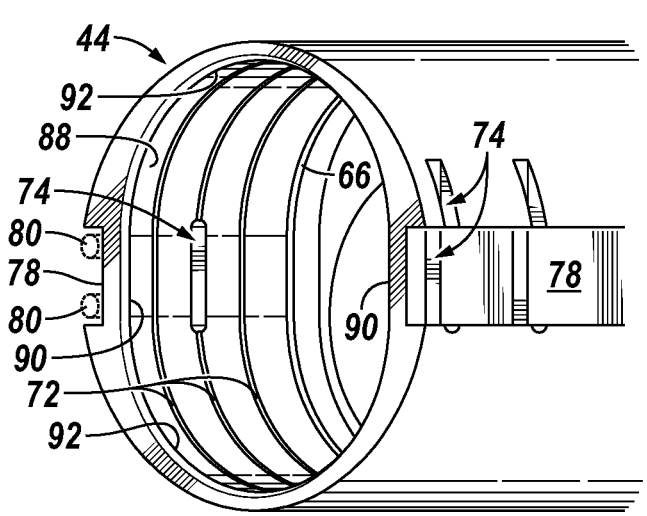
FIG. 7 is an orthogonal view of an example of a corresponding connector end, according to an embodiment of the disclosure.

With additional reference to FIGS. 6 and 7, the first connector end 42 and the second connector end 44 may be formed with corresponding grooves 70, 72, respectively. The grooves 70, 72 hold the corresponding locking wire or wires 68 so that the locking wires 68 provided an obstruction to separation of connector ends 42, 44. The locking wires 68 may be fed into corresponding grooves 70, 72 through locking wire windows 74, e.g. openings, after linear insertion of first connector end 42 into second connector end 44. The windows 74 extend laterally through a sidewall of second connector end 44, as illustrated in FIG. 7. It should be noted that locking mechanism 60 may utilize other components to provide the locking function. For example, instead of wires 68, rods, ball bearings, or other components may be fed through windows 74 and into the corresponding grooves 70, 72 to prevent inadvertent separation of the joined tubulars 46 and 52.

Figure 8:
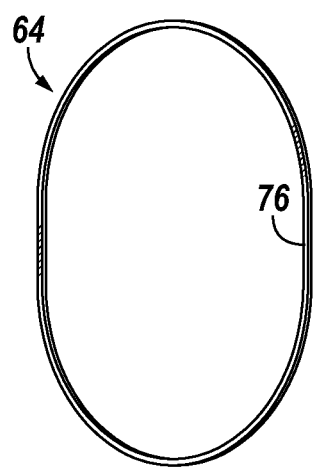
FIG. 8 is an illustration of a non-circular backup seal which may be employed in the linear connection system, according to an embodiment of the disclosure.

Similarly, the seal system 58 may comprise a variety of seal components used at individual or multiple locations. By way of example, each seal location may utilize a combination of a resilient, elastomeric seal 62, such as an O-ring, combined with an individual or a pair of backup seal rings 64. As illustrated in FIG. 8, the backup ring or rings 64 may be formed, e.g. machined, from a relatively rigid material and each ring 64 may be pre-formed into a shape matching the cross-sectional shape of linearly engaged ends 42, 44. In the specific example illustrated, the backup ring 64 comprises generally flat sides 76 which help provide support for the resilient, elastomeric seal 62.

Referring again to FIGS. 6 and 7, the tubulars 28, e.g. first tubular 46 and second tubular 52, may further comprise an external bypass slot 78. In the specific example illustrated, the tubulars 46, 52 comprise a plurality of external bypass slots 78. Each external bypass slot 78 is designed to carry a control line 80 or a plurality of control lines 80, as indicated by dashed lines in FIG. 7. The control lines 80 may comprise electrical lines, fluid lines, fiber-optic lines, and various combinations of communication lines. For example, the control lines 80 may comprise electrical cables or hybrid cables carrying both electrical lines and other types of communication lines, e.g. fiber-optic lines and hydraulic lines.

By forming the connector ends 42, 44 with a non-circular, transverse cross-sectional shape, e.g. an oblong shape, space is provided for the control lines 80. In the embodiment illustrated, for example, the non-circular cross-section of connector ends 42, 44 provides generally flat sides which create room for external bypass slots 78. As illustrated in FIG. 6, for example, first connector end 42 may be designed with an exterior 82 which in transverse cross-section has generally flat sides 84 joined by rounded ends 86. The generally flat sides 84 create room for bypass slots 78. Similarly, the second connector end 44 is designed to linearly receive first connector end 42 and has an interior surface 88 which in transverse cross-section has generally flat sides 90 joined by internal, rounded ends 92. The generally flat sides 90 also create room for external bypass slots 78 as illustrated. Additionally, the corresponding non-circular, transverse cross-sectional shapes of ends 42, 44 may be used to facilitate proper orientation and alignment of flow passages 48 while providing torque resistance. The torque resistance allows torque on the tubulars 28 to be transmitted through the connection.

The connector ends 42 and 44 may be designed to enable linear engagement of a wide variety of tubulars 28. In the example illustrated in FIGS. 5-7, however, the connector ends 42 and 44 (along with first tubular 46 and second tubular 52) are designed to create a multilateral Y-block, e.g. Y-block 40. The connector ends 42, 44 maintain alignment of the two "Y" legs of the Y-block throughout the tool while allowing for internal connections designed to facilitate manufacturing of the tubular components. The non-circular design may be used to reduce the tubular wall thickness, and the design also enables use of components, e.g. tubular components, which are non-cylindrical.

As briefly described above, the non-circular geometry of the linear connection systems 30 facilitates introduction of the bypass slots 78 on either or both sides of the linear connection system 30. The bypass slot or slots 78 may be used for intelligent well completion hardware, such as electrical cables or other control lines. This capability facilitates installation of, for example, intelligent control equipment below the Y-block 40.

The system 20, e.g. well system, may be used in a variety of applications, including numerous well production and treatment applications as well as non-well related tubing applications. Depending on the specifics of a given tubing string, well application, and environment, the design of the overall system 20, tubing string 32, and linear connection system 30 may vary. Additionally, the system may be designed for use in many types of wells, including vertical wells and deviated, e.g. horizontal, wells. The wells may be drilled in many types of formations with single or multiple production zones. For example, multiple linear connection systems 30 may be in the form of multiple Y-blocks used to accommodate tubing structures in multiple lateral bores.

Depending on the application, the linear connection system or systems 30 may be constructed in several configurations. For example, the transverse, cross-sectional shape of the connector ends may vary while still enabling linear engagement and restriction against relative rotational movement. Additionally, the tubulars forming each linear connection system may comprise individual internal flow passages or multiple, isolated flow passages to provide separate flows of fluid. The sealing system and locking mechanism also may vary. In wire-based locking mechanisms, for example, multiple wires may be employed or a single lock wire may be routed along a continuous groove. The external bypass slot or slots also may have a variety of shapes, depths, lengths, and configurations which utilize the space provided by the non-standard, e.g. non-circular, connection ends of each linear connection system 30. The materials used to form the tubulars and the components used in cooperation with the tubulars also may vary widely depending on the specifics of a given application.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A well system, comprising:
    a well tubing string comprising:
        a first tubular with a first connector end having an exterior surface with a non-circular transverse cross-section;
        a second tubular with a second connector end having an interior surface with a corresponding non-circular transverse cross-section linearly receiving the first connector end;
        a seal between the first connector end and the second connector end, the seal positioned in a seal groove formed in the exterior surface of the first connector end or in the interior surface of the second connector end; and
        a locking mechanism coupling the first tubular to the second tubular and consisting of one or more wires disposed in corresponding radial grooves formed in the exterior surface of a non-tapered portion of the first connector end and in the interior surface of a non-tapered portion of the second connector end to prevent inadvertent separation of the first connector end from the second connector end, and
    wherein the non-circular transverse cross-section of the first connector end and the corresponding non-circular transverse cross-section of the second connector end, which slidably receives the first connector end therein, each comprises a pair of rounded ends connected by longitudinal flat sides.

2. The system as recited in claim 1, wherein the first tubular comprises a pair of isolated, internal fluid flow passages.

3. The system as recited in claim 1, wherein the first tubular and the second tubular form a multilateral Y-block.

4. The system as recited in claim 1, further comprising a control line disposed in the external bypass slot.

5. The system as recited in claim 1, wherein the seal comprises an O-ring seal.

6. The system as recited in claim 5, wherein the seal comprises a backup ring.

7. The system as recited in claim 1, wherein the locking mechanism comprises a plurality of wires which are each fed through an opening in the second connector end to a position between the first connector end and the second connector end.

8. The well system of claim 1, wherein at least one of the longitudinal flat sides creates room for an external bypass slot that extends lengthwise along an exterior of the first tubular and the second tubular.

9. A method of forming a connection, comprising:
forming a first tubular with a first connector end having an exterior surface with a non-circular transverse cross-section;
forming a second tubular with a second connector end having an interior surface with a corresponding, non-circular transverse cross-section which matingly engages the first connector end,
wherein the non-circular transverse cross-section of the first connector end and the corresponding non-circular transverse cross-section of the second connector end, which slidably receives the first connector end therein, each comprises a pair of rounded ends connected by longitudinal flat sides;
providing an external control line bypass slot in at least one of the longitudinal flat sides and along an exterior of the first tubular and the second tubular;
causing linear movement between the first tubular and the second tubular until the first connector end and the second connector end are engaged to form a tubing string;
sealing the first connector end with the second connector end by positioning a seal in a seal groove formed in the exterior surface of the first connector end or in the interior surface of the second connector end; and
coupling together the first tubular and the second tubular via a locking mechanism consisting of one or more locking wires inserted in corresponding radial grooves formed in the exterior surface of a non-tapered portion of the first connector end and in the interior surface of a non-tapered portion of the second connector end after engagement of the first connector end and the second connector end.

10. The method as recited in claim 9, further comprising moving the tubing string downhole into a wellbore after locking.

11. The method as recited in claim 9, further comprising placing a control line in the external control line bypass slot and moving the tubing string downhole into a wellbore.

12. The method as recited in claim 9, wherein sealing comprises using an O-ring seal.

13. The method as recited in claim 9, further comprising providing a plurality of isolated flow passages through at least one of the first tubular and the second tubular.

14. The method as recited in claim 9, wherein causing linear movement comprises forming a multilateral Y-block in the tubing string.

15. A well system, comprising:
a Y-block having a pair of tubular components coupled via linear sliding engagement of a first connector end with a second connector end at a non-tapered connection region, the first connector end having an exterior surface with a non-circular transverse cross-section and the second connector end having an interior surface with a corresponding non-circular transverse cross-section, the Y-block further comprising a locking mechanism consisting of one or more wires disposed in corresponding radial grooves formed in the exterior surface of a non-tapered portion of the first connector end and in the interior surface of a non-tapered portion of the second connector end, which couples and linearly locks together the first connector end and the second connector end,
wherein the non-circular transverse cross-section of the first connector end and the corresponding non-circular transverse cross-section of the second connector end, which slidably receives the first connector end therein, each comprises a pair of rounded ends connected by longitudinal flat sides, and
wherein the Y-block further comprises an external bypass slot in at least one of the longitudinal flat sides for receiving at least one control line.

\* \* \* \* \*